United States Patent [19]

Merdian, Jr. et al.

[11] 4,414,590
[45] Nov. 8, 1983

[54] MEDIA INTERCHANGE SWITCH FOR MAGNETIC DISK DRIVES

[75] Inventors: Anton W. Merdian, Jr., Boulder County; Joseph K. Jurneke; Frank W. Pinteric, both of Adams County, all of Colo.

[73] Assignee: Storage Technology Corporation, Louisville, Colo.

[21] Appl. No.: 278,389

[22] Filed: Jun. 29, 1981

[51] Int. Cl.³ .................... G11B 5/012; G11B 21/08; G11B 21/10
[52] U.S. Cl. ........................................ 360/97; 360/98
[58] Field of Search .................................. 360/77–78, 360/79, 62, 98, 97, 99, 86, 105, 109; 369/29

[56] References Cited

U.S. PATENT DOCUMENTS

| 3,814,906 | 6/1974 | Trotta | 360/98 |
| 3,864,750 | 2/1975 | Applequist | 360/98 |
| 3,893,178 | 7/1975 | Sordello | 360/98 |
| 3,984,873 | 10/1976 | Pescha | 360/98 |
| 4,270,154 | 5/1981 | Crawford | 360/98 |

OTHER PUBLICATIONS

IBM Tech. Disc. Bull, J. M. Waddell et al., Scheduling Memory Resources in a Virtual Environment, vol. 17, No. 7, Dec. 1974, pp. 1873–1874.

Primary Examiner—Alfred H. Eddleman
Attorney, Agent, or Firm—Woodcock, Washburn, Kurtz, Mackiewicz & Norris

[57] ABSTRACT

A magnetic disk drive has a media interchange switch which interconnects the two head/disk drive assemblies with the two electronic systems in the drive. A manually operated switch on the operator panel operates a latching relay to one of two positions. Multiple pole, double throw relay contacts actuated by the latching relay connect spindle and head address signals, data signals, servo signals and other signals between either of the two head/disk assemblies and either of the two electronic systems. The sets of the switch contact poles are connected so that ground potential appears on switch contacts interposed between two active signal lines. In this manner, shielding is obtained with relays which otherwise have such low intercontact isolation that signal interference would be present.

9 Claims, 4 Drawing Figures

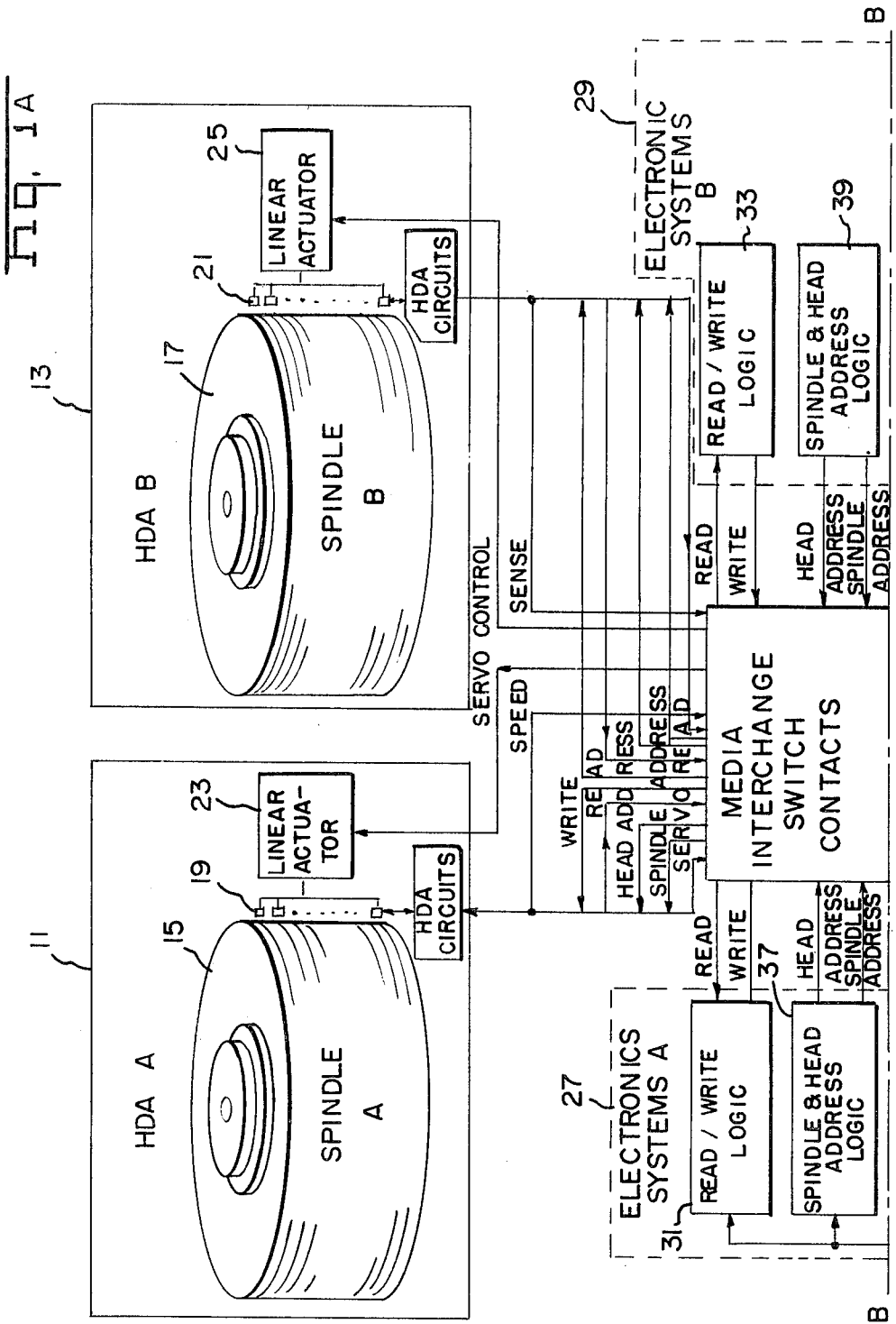

MEDIA INTERCHANGE SWITCH FOR MAGNETIC DISK DRIVES

BACKGROUND OF THE INVENTION

This invention relates to magnetic disk drives and, more particularly, to a switch for interchanging the electronic systems in a two spindle disk drive.

High capacity magnetic disk drives include a plurality of magnetic disks rotated on a common spindle. Fixed disk drives such as the IBM 3350 and Storage Technology Corporation 8350/8650/8370 disk drives include two spindles in each drive. The spindles, disks, magnetic heads, actuator, and associated circuitry are referred to as a "head/disk assembly" (HDA). Each head/disk assembly has its own electronic system which has logic circuitry for processing the digital data signals written onto and read back from the magnetic disks. The electronic systems also include circuitry for generating spindle and head addresses, which control the actuators to access particular tracks on the disks. The electronic systems communicate with a bus connected to the disk controller and the host computer.

In many applications, it is very important to have continuous access to the data on the disks. For example, some time sharing customers require continuous data availability even when one of the electronic systems fail. In accordance with current practice, when one of the electronic systems fails, a field engineer is called and he can switch the head/disk assembly to an alternate electronic system.

Movable media disk drives provide more flexibility because the disk cartridge or pack can be removed or placed on another machine. However, this alternative is not available in high capacity fixed media drives of the type under consideration.

It is an object of the present invention to significantly reduce the period of data inaccessibility during unscheduled interruptions of magnetic disk drive operation.

SUMMARY OF THE INVENTION

In accordance with the present invention, a media interchange switch can be actuated from the operator panel of a disk drive. This switches all of the lines interconnecting a head/disk assembly with its electronic system to the other electronic system in the disk drive. This includes switching of all read/write analog/digital data lines, the linear actuator servo signal, the operator panel switches and lights, the sequencing lines which are used to power up the spindles, and the head and spindle address lines.

In carrying out the invention, latching relays are operable to two positions from the operator panel. These latching relays have multiple pole, double throw relay contacts. The spindle and head address signals, digital data signals, servo signals, and other signals between the head/disk assemblies and their respective electronic systems are connected through one set of poles on one throw of the relays and through another set of poles on the other throw of said relays.

In accordance with an important aspect of the present invention, the poles of the relay contacts are connected to provide shielding for the various signals. Relays which are used in digital data applications do not have sufficient isolation to prevent interference between signals of greatly different amplitude as are present in disk drives. For example, the read signals from a magnetic disk are approximately 11 millivolts, whereas the write signals are approximately 1 volt. Available relays provide approximately 17 dB of isolation between the contacts, whereas at least 80 dB of isolation is required to prevent interference between the high and low amplitude signals. In accordance with the present invention, this problem is obviated by connecting the poles of the latching relay so that reference potential is always connected between signals carrying poles. In this manner, the signal carrying poles are shielded one from the other and interference is prevented. The media interchange switch of this invention provides a particularly convenient tool for the field engineer to troubleshoot malfunctions in the system. By merely reversing the switch, each head/disk assembly will operate with a different electronic system. Assuming a single malfunction, this switching will isolate the problem to one of the two head/disk assemblies and two electronic systems.

The foregoing and other objects features and advantages of the invention will be better understood from the following more detailed description and appended claims.

SHORT DESCRIPTION OF THE DRAWINGS

FIGS. 1a and 1b together are a block diagram showing two head/disk assemblies, two electronic systems and the media interchange switch in a disk drive; and FIGS. 2a and 2b together show the relay contacts of the media interchange switch.

DESCRIPTION OF THE PREFERRED EMBODIMENT

Figure 1B:
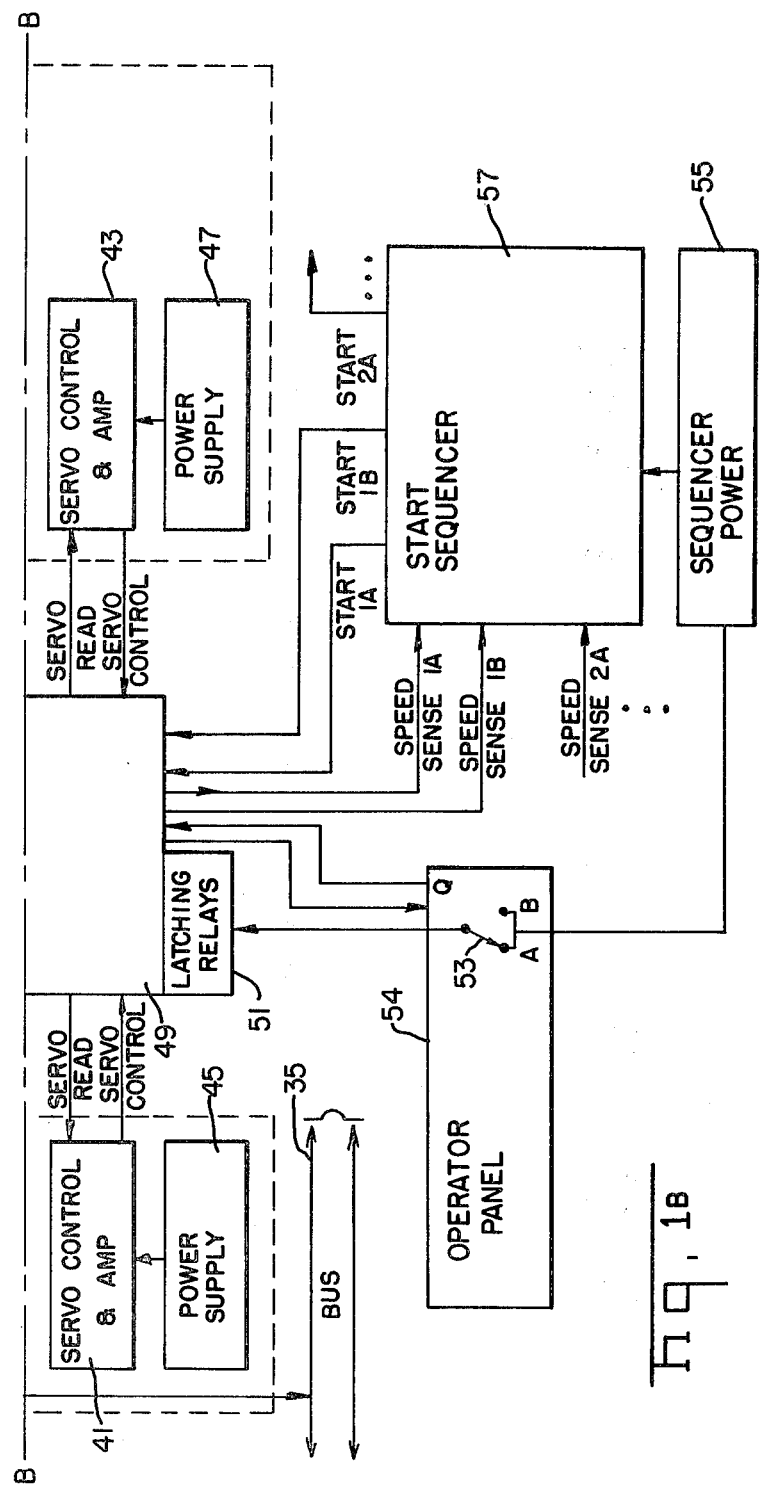

Referring to FIG. 1, a magnetic disk drive includes two head/disk assemblies 11 and 13. Each assembly has a drive spindle 15 and 17 for rotating magnetic disks. Magnetic heads 19 and 21 write digital data onto the disks and read the data from the disks. Linear actuators 23 and 25 respond to a servo control signal to move the heads into read/write relationship with the tracks of the magnetic disks.

Each head/disk assembly has associated therewith an electronic system 27 and 29. These include logic circuits 31 and 33 for processing read and write signals from the disks. These digital data signals are applied to a bus 35 which connects the disk drives to a disk drive controller and to the host computer. Each electronic system also includes logic circuitry 37 and 39 for generating head and spindle address signals. Servo control and amplifier circuitry 41 and 43 responds to a servo read signal from the head/disk assembly and generates a servo control signal which positions the linear actuator in each head/disk assembly. Each electronic system has a power supply 45 and 47.

In accordance with the present invention, the signals between the electronic systems and the head/disk assemblies are connected through media interchange switch contacts 49. The media interchange switch includes latching relays 51 which operate the multiple pole double throw switch contacts 49 to one of two positions. The latching relays 51 are operated by a manually actuated switch 53 on the operator panel 54.

The latching relays 51 are stable in either of their two positions. Therefore, interruption of power does not alter the state of the media interchange switch. The latching relays are actuated by a source of power separate from the power supplies 45 and 47. Therefore, if these supplies are a source of malfunction, the media interchange switch can still be switched to an alternate electronic system. In the present case, the power for the latching relays is taken from the sequencer power supply 55. This power supply supplies power to the start sequencer 57.

The start sequencer is used to start the spindles in a string of disk drives in a sequence. For example, the A spindle of disk drive 1 is first started. When it is up to speed, the B spindle of disk drive 1 is started and so on. Each spindle generates a speed sense signal which indicates when the drive is up to speed. In accordance with the present invention, the speed sense signals and the start signals are also connected through the media interchange switch. This assures that, when a start signal is generated for a particular spindle that the speed sense signal for this spindle will also be applied to the start sequencer.

Figure 2A:
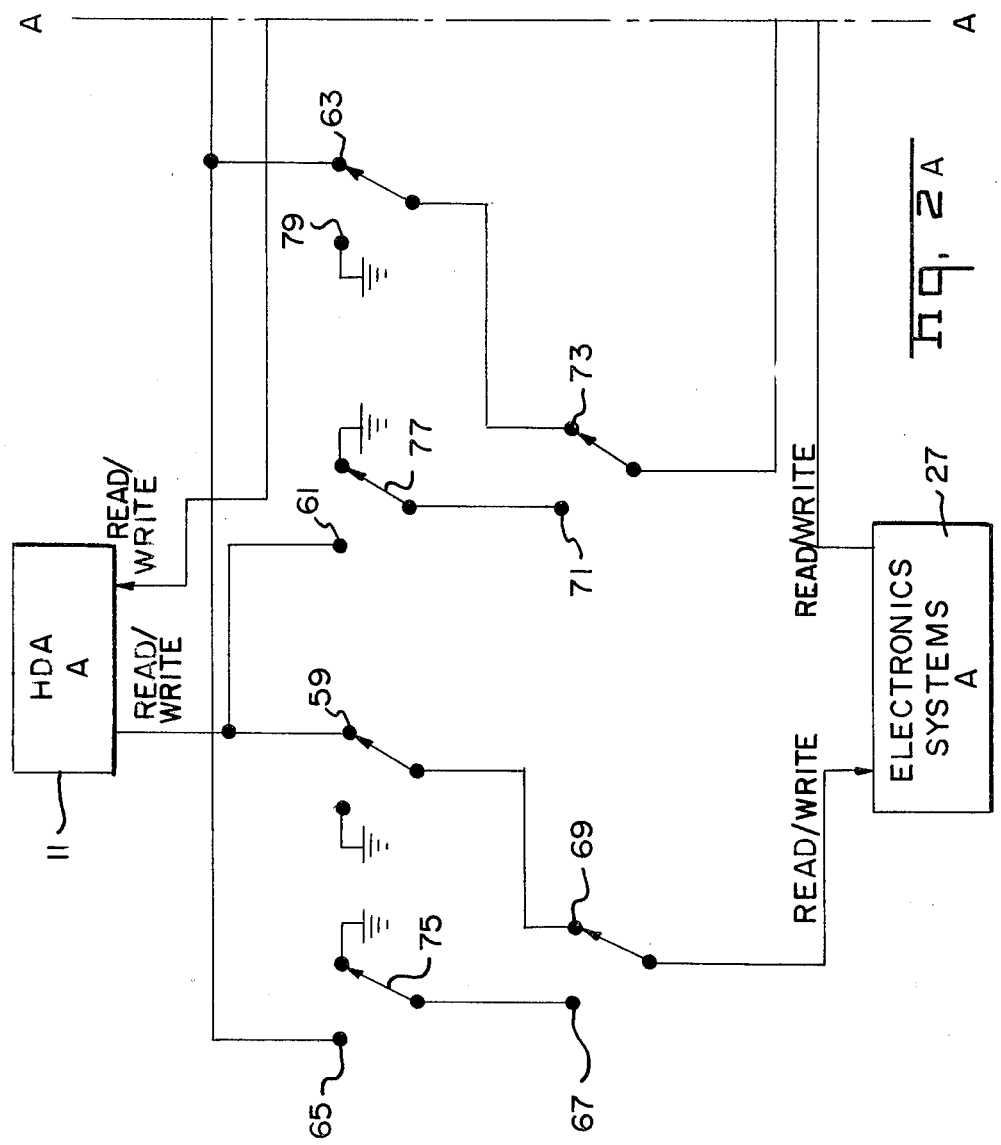
Figure 2B:
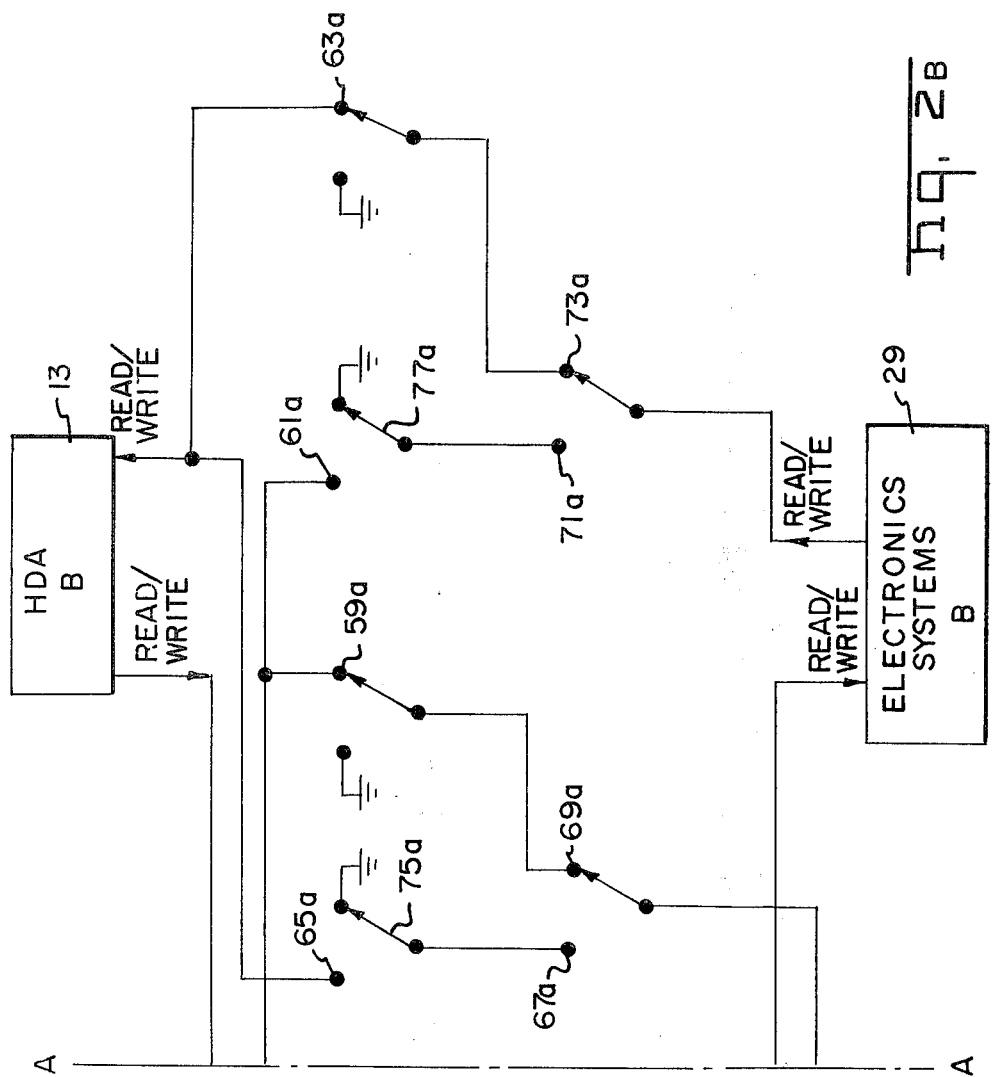

FIG. 2 shows the switch contacts which are used to switch two signals between head/disk assemblies 11 and 13 and their electronic systems 27 and 29. In the example of FIG. 2, two read/write lines are shown for each HDA. In practice, of course, there are many lines for each of the signals connected between the head/disk assemblies and the electronic systems.

In one actual embodiment of the invention, three 48 pole, double throw latching relays were used to switch the signals. In FIG. 2, a first set of poles, including 59 and 59a, connect the read and write signals between head/disk assembly 11 and electronic system 27a. In the example under consideration, the head/disk assembly 11 is considered the first HDA and the electronics system 27 is the first electronic system, whereas head/disk assembly 13 is the second HDA and electronic system 29 is the second electronic system. The switch contacts are shown in the position of the first throw. On the other throw, a second set of poles including 61 and 61a, connect the read and write signals between head/disk assembly 11 and the second electronic system 29.

On the first throw (as shown) a third set of poles including 63 and 63a connect the read and write signals from the second head/disk assembly 13 to the second electronic system 29. On the other throw, read and write signals from the second head/disk assembly are connected through a fourth set of contacts including 65 and 65a to the first electronic system 27. A fifth set of poles, including 67 and 67a, complete the interconnection. A sixth set of poles, including 69 and 69a, are connected between the first electronic system 27 and the poles 59 and 59a. A seventh set of poles, including 71 and 71a, and an eighth set of poles including 73 and 73a, are connected between the electronic system 29 and the sets of poles including 63 and 63a.

In the first throw (as shown) ground potential is connected through switch contact 75 to the pole 67, through switch contact 77 to the pole 71, through switch contact 75a to the pole 67a and through switch contact 77a to the pole 71a. Note that the ground potential between switch contact 75a and pole 67a provides a shield between the read/write signal from pole 65a and the read/write signal from pole 59a to pole 69a. A similar ground connection is provided between all active adjacent signal lines. Similarly, on the other throw of the switch contacts ground potential between pole 79 and pole 73 shields the read/write signal between pole 61 and pole 71 from the read/write signal, on pole 63. Again, on this throw, a grounded line is always interposed between two active signal lines.

One example of a latching relay which is suitable for use is made by T-Bar, Inc. While such mechanical relays have been successfully used, it will be appreciated that electronic switching means can also be used for the media interchange switch.

While a particular embodiment of the invention has been shown and described, various modifications are within the true spirit and scope of the invention. The appended claims are, therefore, intended to cover all such modifications.

What is claimed is:

1. In a magnetic disk drive comprising:
   first and second head/disk assemblies each including a drive spindle for rotating magnetic disks, magnetic heads for writing and reading digital data signals on and from said disks, and an actuator responsive to a servo signal for moving said heads into read/write relationship with the tracks of said disks; and
   first and second electronic systems each having means for generating a spindle and head address signals, logic circuits for processing said digital data signals, and means for processing servo signals;
   a media interchange switch including:
      latching relay means operable to two positions;
      multiple pole, double throw relay contacts actuated by said latching relay means;
      the spindle and head address signals, data signals and servo signals for said first head disk assembly being connected through a first set of said poles to said first electronic system on one throw of said relay contacts and through a second set of said poles to said second electronic system on the other throw of said relay contacts;
      the spindle and head address signals, data signals and servo signals for said second head/disk assembly being connected through a third set of poles to said second electronic system on said one throw of said relay contacts and through a fourth set of said poles to said first electronic system upon said other throw of said relay contacts.

2. The media interchange switch recited in claim 1 wherein said latching relay means is manually operable by an operator to selectively connect either of said head/disk assemblies to either of said electronic systems.

3. The media interchange switch recited in claim 2 wherein said latching relay means is operated from a source of power separate from said electronic systems.

4. A magnetic disk drive comprising:
   first and second head/disk assemblies each including a drive spindle for rotating magnetic disks;
   magnetic heads for writing and reading of digital data signals on and from said disks;
   an actuator for moving said heads into read/write relationship with the tracks of said disks;
   first and second electronic systems each having circuitry for controlling the writing and reading of digital data on said disks; and
   a media interchange switch having switching means for selectively connecting either of said head/disk assemblies to either of said electronic systems.

5. The disk drive recited in claim 4 wherein said switching means is manually operable by an operator.

6. The disk drive recited in claim 4 wherein said media interchange switch includes:

latching relay means operable to two positions;
multiple pole, double throw relay contacts actuated by said latching relay;
the spindle and head address signals, data signals and servo signals for said first head disk assembly being connected through a first set of said poles to said first electronic system on one throw of said relay contacts and through a second set of said poles to said second electronic system on the other throw of said relay contacts;
the spindle and head address signals, data signals and servo signals for said second head/disk assembly being connected through a third set of poles to said second electronic system on said one throw of said relay contacts and through a fourth set of said poles to said first electronic system upon said other throw of said relay contacts.

7. The disk drive recited in claim 6 further comprising:
fifth and sixth sets of poles connected between said first electronic system and said first and fourth sets of poles;
seventh and eighth sets of poles connected between said second electronic system and said second and third sets of poles, said fifth and seventh sets of poles being connected to reference potential on said one throw, said sixth and eighth sets of poles being connected to reference potential on said other throw to shield the first, second, third, and fourth sets of poles when they are not connected to an electronic system.

8. In a magnetic disk drive comprising:
first and second head/disk assemblies each including a drive spindle for rotating magnetic disks, magnetic heads for writing and reading digital data signals on and from said disks, and an actuator responsive to a servo signal for moving said heads into read/write relationship with the tracks of said disks; and
first and second electronic systems each having means for generating a spindle and head address signals, logic circuits for processing said digital data signals, and means for processing servo signals;
a media interchange switch including:
latching relay means operable to two positions;
multiple pole, double throw relay contacts actuated by said latching relay means;
the spindle and head address signals, data signals and servo signals for said first head disk assembly being connected through a first set of said poles to said first electronic system on one throw of said relay contacts and through a second set of said poles to said second electronic system on the other throw of said relay contacts;
the spindle and head address signals, data signals and servo signals for said second head/disk assembly being connected through a third set of poles to said second electronic system on said one throw of said relay contacts and through a fourth set of said poles to said first electronic system upon said other throw of said relay contacts;
fifth and sixth sets of poles connected between said first electronic system and said first and fourth sets of poles;
seventh and eighth sets of poles connected between said second electronic system and said second and third sets of poles, said fifth and seventh sets of poles being connected to reference potential on said one throw, said sixth and eighth sets of poles being connected to reference potential on said other throw to shield the first, second, third, and fourth sets of poles when they are not connected to an electronic system.

9. A magnetic disk drive comprising:
first and second head/disk assemblies each including a drive spindle for rotating magnetic disks;
magnetic heads for writing and reading of digital data signals on and from said disks;
an actuator for moving said heads into read/write relationship with the tracks of said disks;
first and second electronic systems each having circuitry for controlling the writing and reading of digital data on said disks; and
a media interchange switch having switching means for selectively connecting either of said head/disk assemblies to either of said electronic systems, said switch being a multiple pole, double throw switch having reference potential applied to selected poles of said switch to shield the signal carrying poles of said switch one from the other.

* * * * *